(12) United States Patent
Yoon

(10) Patent No.: US 7,746,035 B2
(45) Date of Patent: Jun. 29, 2010

(54) BATTERY MODULE HAVING SIMPLE-STRUCTURE SAFETY DEVICE

(75) Inventor: Junill Yoon, Daejeon (KR)

(73) Assignee: LG Chem, Ltd. (KR)

( * ) Notice: Subject to any disclaimer, the term of this patent is extended or adjusted under 35 U.S.C. 154(b) by 536 days.

(21) Appl. No.: 11/685,312

(22) Filed: Mar. 13, 2007

(65) Prior Publication Data

US 2007/0210752 A1      Sep. 13, 2007

(30) Foreign Application Priority Data

Mar. 13, 2006   (KR) ...................... 10-2006-0022936

(51) Int. Cl.
  *H01J 7/04*    (2006.01)
  *H01J 7/16*    (2006.01)
  *H01M 2/00*   (2006.01)
  *H01M 10/50*  (2006.01)

(52) U.S. Cl. .................. 320/150; 320/154; 320/160; 429/61; 429/62

(58) Field of Classification Search .......... 320/150, 320/154, 160
  See application file for complete search history.

(56) References Cited

U.S. PATENT DOCUMENTS 6,137,262 A    10/2000   Hauer

FOREIGN PATENT DOCUMENTS

KR    1020010046873    6/2001

*Primary Examiner*—Edward Tso
*Assistant Examiner*—Yalkew Fantu
(74) *Attorney, Agent, or Firm*—Cantor Colburn LLP

(57) ABSTRACT

Disclosed herein is a medium- or large-sized battery module having a plurality of battery cells (unit cells), wherein the battery module is constructed in a structure in which detection units for detecting physical operation state of the battery cells are mounted to the respective battery cells, the detection units are connected to a control unit of the battery module while the detection units are connected in series with each other, and signals (detected signals) detected from the respective battery cells are transmitted to the control unit while the detected signals are included in signals detected from the entire battery cells. The detection units are mounted to the respective battery cells, and therefore, the accuracy of information on the physical operation state of the battery cells is improved, and the circuit for transmitting the detected signals to the control unit is simple although the number of the detection units is large. Consequently, it is possible to construct a battery module having a simple structure. In addition, the volume change measurement sensors formed in a specific shape are used for a battery module using lithium secondary batteries as unit cells, and therefore, it is possible to accomplish the simple structure of the battery module with reduced costs and to secure the safety of the battery module with high accuracy.

14 Claims, 3 Drawing Sheets

< Prior Art >

BATTERY MODULE HAVING SIMPLE-STRUCTURE SAFETY DEVICE

FIELD OF THE INVENTION

The present invention relates to a battery module having a simple-structure safety device, and, more particularly, to a medium- or large-sized battery module constructed in a structure in which detection units for detecting physical operation state of the battery cells are mounted to the respective battery cells, the detection units are connected to a control unit of the battery module while the detection units are connected in series with each other, and signals (detected signals) detected from the respective battery cells are transmitted to the control unit while the detected signals are included in signals detected from the entire battery cells, whereby the detected signals from the respective battery cells are not individually but wholly transmitted to the control unit, and therefore, the structure for transmitting the detected signals is simplified.

BACKGROUND OF THE INVENTION

A secondary battery, which can be charged and discharged, has been increasingly used as a power source for medium- or large-sized devices, such as electric vehicles and hybrid electric vehicles, as well as small-sized mobile devices. When the secondary battery is used as the power source for the medium- or large-sized devices, a plurality of unit cells (secondary batteries) are connected in series or in series/parallel with each other so as to manufacture a battery module(s) providing high output. Consequently, the battery module is generally constructed in a structure in which the plurality of secondary batteries are electrically connected with each other.

Up to now, nickel-metal hydride secondary batteries have been widely used as the unit cells (battery cells) of the medium- or large-sized battery module. Recently, however, lithium secondary batteries have attracted considerable attention as the unit cells (battery cells) of the medium- or large-sized battery module because the lithium secondary batteries have high energy density and high discharge voltage.

The battery module is constructed in a structure in which a plurality of battery cells are included in the battery module. Consequently, it is necessary to detect the operation state of the respective battery cells and to control the operation of the respective battery cells. For example, it is necessary to detect physical operation states of the respective battery cells, such as the voltage and the temperature of the battery cells, and to secure the optimum operation state and the safety of the respective battery cells. The detection of the physical operation states of the respective battery cells is accomplished by a construction in which connecting members for voltage measurement, such as wires, are connected to the battery cells to be measured and a control unit and a construction in which temperature sensors are mounted at the outer surfaces of the battery cells to be measured or adjacent to the battery cells, and signals detected by the respective temperature sensors are transmitted to a control unit via connecting members.

As the number of the battery cells constituting the battery module is increased, therefore, the connection structure between the detection unit for detecting the physical operation state of the respective battery cells and the control unit is very complicated. In the construction for measuring the voltage of the battery cells, a process for detecting the voltage of the battery cells and transmitting the detected signals to the control unit is individually carried out. However, the measurement of the temperature of the respective battery cells must be improved.

When the lithium secondary batteries as described above are used as the unit cells of the battery module, on the other hand, the safety problem of the battery module must be more carefully considered. Each lithium secondary battery suffers relatively large volume change when lithium ions are absorbed to or discharged from anodes. Specifically, the lithium secondary battery is repeatedly expanded and contracted during the repetitive charge and discharge of the lithium secondary battery. The repetitive expansion and contraction of the lithium secondary battery increases the internal resistance of the lithium secondary battery. As a result, the efficiency of the lithium secondary battery is greatly reduced. Also, a battery case is separated from the remaining part of the lithium secondary battery due to the excessive expansion of the lithium secondary battery. As a result, an electrolyte leaks from the lithium secondary battery, and therefore, the lithium secondary battery may catch fire or explode. Furthermore, the fire or explosion of some of the battery cells results in the consecutive fire or explosion of the remaining battery cells, whereby a serious situation may be caused.

In a medium- or large-sized battery module using the lithium secondary batteries as the unit cells, therefore, it is necessary to detect the expansion state of the respective unit cells in consideration of the above-mentioned problems. Some conventional arts propose a technology for mounting a piezoelectric element or another unit to measure the expansibility of the battery cells to the surface of the battery cells.

When the above-mentioned detection unit and connecting members are further mounted to the battery module so as to detect the volume expansibility of the battery cells, however, the structure for detecting the physical operation state of the battery cells is further complicated.

For example, a construction for detecting a physical operation state of battery cells of a conventional medium- or large-sized battery module having a plurality of battery cells is illustrated in FIG. 1.

FIG. 1 schematically shows only the construction for obtaining a detected signal. As the number of physical operation states obtained from the battery cells is increased, however, the number of sensors is also increased. Furthermore, the number of detection circuits for electrically connecting the sensors is also increased with the result the structure of the battery module having a restricted size is further complicated.

In this connection, U.S. Pat. No. 6,137,262 discloses a technology for acquiring information on physical operation states from battery cells of a medium- or large-sized battery module having a plurality of battery cells connected in series with each other, converting the acquired information into coded alternating current voltage, and transmitting the coded alternating current voltage to a control unit via a power cable of the battery module. The technology disclosed in the U.S. Pat. No. 6,137,262 is embodied in a very simple structure because the signals detected from the respective battery cells are transmitted to the control unit not using an additional connecting member but using the power cable of the battery module. However, it is necessary to mount additional units for converting the detected signals into coded alternating current voltage to the respective battery cells. Consequently, the manufacturing costs of the battery module are inevitably increased. Furthermore, the structure of the battery module is further complicated due to the provision of the conversion units.

Also, Korean Patent Application Publication. No. 2001-46873 discloses a technology for measuring the voltage change of a plurality of thermocouples connected in series with each other and located at opposite ends of battery cells to detect the abnormal state of the battery cells while temperature sensors are not mounted to the respective battery cells. As clearly described in the specification of the Korean Patent Application Publication No. 2001-46873, the disclosed structure has an advantage in that the number of the temperature sensors, as detection members, is reduced, and therefore, a circuit for transmitting the detected signals is simplified. However, the disclosed structure has a fundamental problem in that the operation state information on the respective battery cells cannot be detected, and therefore, it is not possible to secure the substantial safety of the battery cells. In addition, the disclosure of the above-mentioned publication is limited to apply to a technology for measuring the expansibility of the respective battery cells of the battery module using the lithium secondary batteries as the unit cells.

Consequently, there is high necessary of a battery module having a new structure in which the construction for detecting information with respect to the respective battery cells and transmitting the detected signals to the control unit is simplified.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present invention have found that, when detection units are attached respectively to battery cells so as to accurately acquire physical operation state information of the respective battery cells constituting a battery module, the detection units are electrically connected in series with each other, and only the outermost detection units are electrically connected to a control unit, abnormal operation states caused from specific battery cells can be integrally confirmed by one detected signal transmitted to the control unit, whereby, even when the number of the detection units is equal to the number of the battery cells, it is possible to accomplish a simple circuit construction of the battery module. The present invention has been completed based on these findings.

In accordance with the present invention, the above and other objects can be accomplished by the provision of a medium- or large-sized battery module having a plurality of battery cells (unit cells), wherein the battery module is constructed in a structure in which detection units for detecting physical operation state of the battery cells are mounted to the respective battery cells, the detection units are connected to a control unit of the battery module while the detection units are connected in series with each other, and signals (detected signals) detected from the respective battery cells are transmitted to the control unit while the detected signals are included in signals detected from the entire battery cells.

Specifically, the battery module according to the present invention is constructed such that the detection units for detecting the physical operation state of the battery cells are attached to the respective battery cells, whereas the detected signals detected from the respective battery cells are transmitted to the control unit as a single signal with respect to the entirety of the battery cells. When the value of the detected signal exceeds the critical value, the control unit determines that the battery module is in an abnormal operation state, and therefore, controls the operation of the battery module. When some battery cells of a medium- or large-sized battery module including a plurality of battery cells are abnormally operated, the safety of the entirety of the battery module may be deteriorated due to a chain reaction. With the above-described construction according to the present invention, therefore, it is possible to effectively control the battery module even when some of the battery cells are abnormally operated.

Preferably, the physical operation state of the battery cells are the temperature change and/or the volume change of the battery cells. Consequently, when the physical operation state of the battery cells to be detected are the temperature change of the battery cells, the detection units may be temperature sensors. According to the present invention, the temperature sensors, as the detection units, are attached to the respective battery cells, the temperature sensors are connected in series with each other, and only the outermost temperature sensors, i.e., a first temperature sensor and an $n^{th}$ temperature sensor, are electrically connected to the control unit. Signals detected from the intermediate temperature sensors, i.e., an $i^{th}$ temperature sensor and an $i+1^{th}$ temperature sensor, are integrated into a signal detected from the $n^{th}$ temperature sensor. Consequently, a detected signal range when all the battery cells has a normal operation temperature is previously set, and, when high temperature is detected from at least one temperature sensor, and the detected signal exceeds the previously set range, it is determined that the battery module is abnormally operated.

When the physical operation state of the battery cells to be detected are the volume change of the battery cells, the detection units may be volume change measuring sensors, such as piezoelectric elements or mechanical cut-off sensors. Especially, the volume change measurement is more preferable in a battery module using lithium secondary batteries as the battery cells.

The piezoelectric elements are elements constructed in a structure in which, an external force is applied to a specific crystal plate in a predetermined direction, positive and negative charges proportional to the external force are generated at opposite major surfaces of the plate. When the volume of the battery cells is increased, a predetermined current is generated, and therefore, it is possible to confirm the abnormality of the battery cells.

The mechanical cut-off sensors are sensors constructed in a structure in which electric cut-off are induced by a predetermined construction when the volume of the battery cells is increased. The electric cut-off is mechanically performed in response to the expansion of the battery cells. This structure may be modified in various manners, and all the modifications must be interpreted to be included within the scope of the present invention.

In a preferred embodiment, the volume change measuring sensors are wire members, having a low coefficient of expansion, continuously connected with each other, and the wire members are connected to the control unit while the wire members continuously surround the outer surfaces of the respective battery cells. The volume change measuring sensors constructed in the wire structure, i.e., the wire members, have an advantage in that the wire members are inexpensive and easily attached to the battery cells as compared to the piezoelectric elements and the mechanical cut-off sensors.

The wire members may surround the outer surfaces of the battery cells in various manners. For example, the wire members may be connected with each other in zigzags such that the wire members surround opposite major surfaces of the neighboring battery cells, or the wire members may be connected with each other such that the wire members surround outer surfaces of the respective battery cells once or more, and then the wire members also surround the outer surfaces of the neighboring battery cells in the same manner.

The wire members are continuously connected with each other such that the wire members surround a middle part of the battery cells, the volume change of which is large at the time of expansion of the battery cells. Consequently, it is possible to increase the accuracy in measurement of the volume change of the battery cells.

The volume change signals (detected signals) of the battery cells transmitted to the control unit through the wire members may be used, for example, as input data necessary for execution of a predetermined algorithm for securing the safety of the battery cells or as operation signals for performing an mechanical operation based on the change of a tensile force of the wire members. That is, the detected signals may be used in various forms depending upon the construction of the control unit. An example used as the input data may be confirmed from a control process, which will be described hereinafter. As an example used as the operation signals, the control unit includes a safety switch that is operated in a mechanical operating fashion, or the control unit is a safety switch, and, when the magnitude of the change of the tensile force (displacement) transmitted from the wire members exceeds a predetermined level, the safety switch is cut off. Of course, however, other various constructions may be also possible.

Preferably, the control unit performs a predetermined control process when the detected signals transmitted from the detection units exceed a predetermined critical value.

For example, the control process may include a first control step of transmitting an alert signal, a second control step of turning power off, a third control step of operating a cooling system, and a fourth control step of operating an extinguishing system.

The control unit may be included in the battery module as an independent unit. Preferably, however, the control unit is included in a battery management system (BMS) that manages the operation of the battery module.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 2:
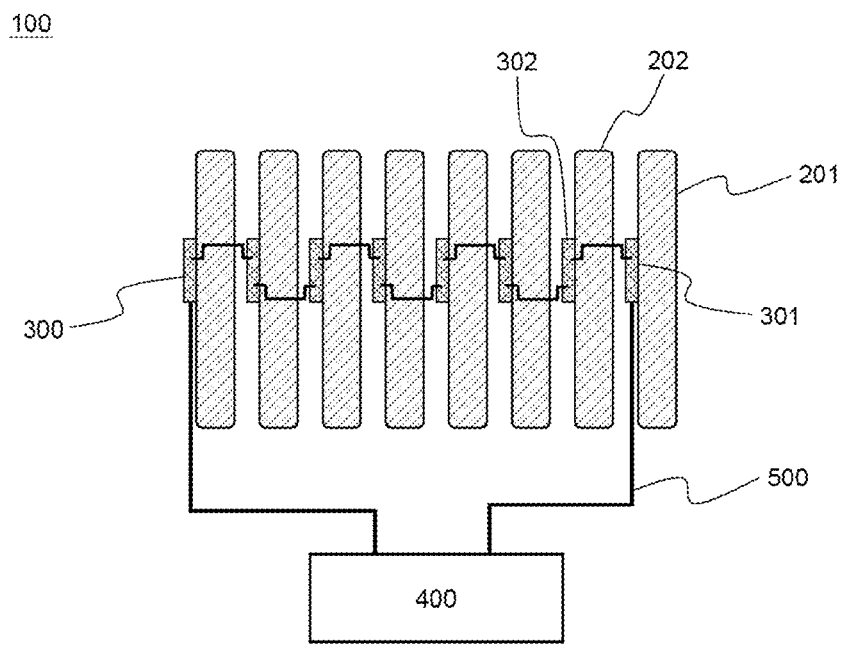
FIG. 2 is a view illustrating a battery module having a construction for detecting the temperature change of battery cells according to a preferred embodiment of the present invention.

FIG. 2 is a view illustrating a battery module 100 having a construction for detecting the temperature change of battery cells according to a preferred embodiment of the present invention.

Figure 1:
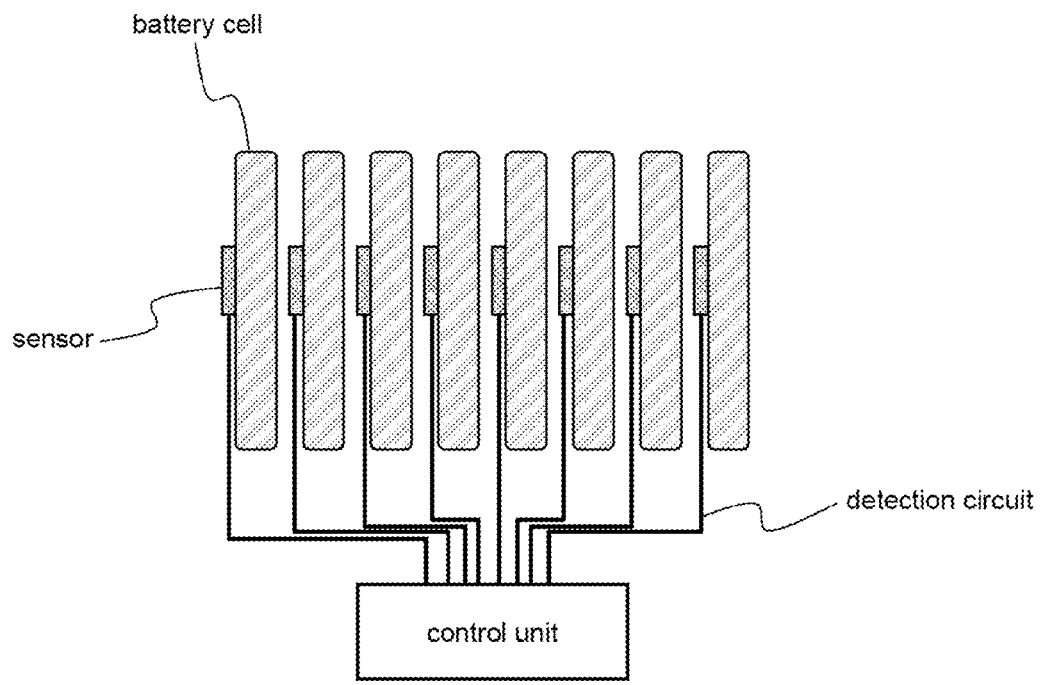
FIG. 1 is a view illustrating a construction for detecting a physical operation state of battery cells of a conventional medium- or large-sized battery module having a plurality of battery cells.

Referring to FIG. 2, the battery module 100 is constructed in a structure in which a plurality of battery cells 201, 202 . . . are packed with high integration, and temperature sensors 301, 302 . . . are attached to one-side outer surfaces of the respective battery cells 201, 202 . . . . The temperature sensors 301, 302 . . . are electrically connected in series with each other. Only the outermost temperature sensors 301 and 308 are connected to a control unit 400. Consequently, a circuit 500 for connecting the temperature sensors 301, 302 . . . to the control unit 400 is very simple as compared to the structure of FIG. 1.

Figure 3A:
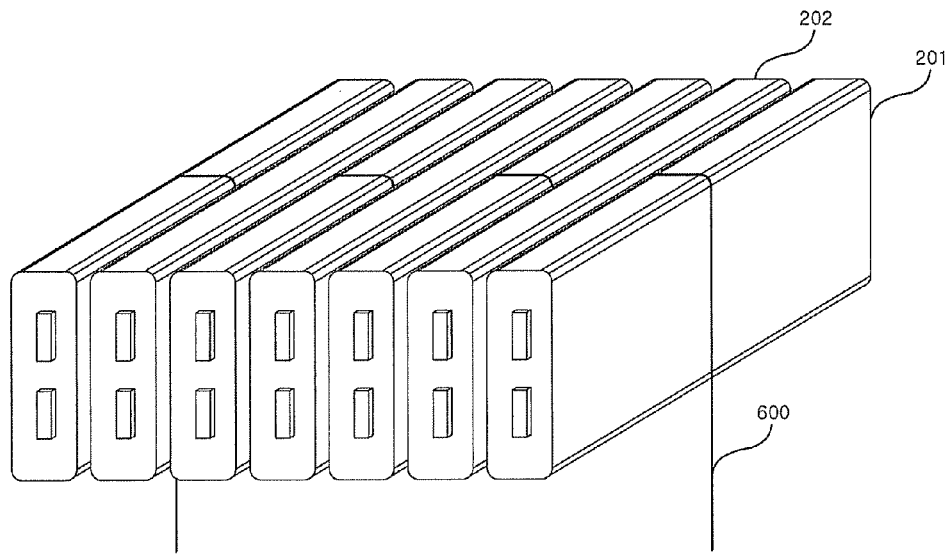
FIGS. 3A and 3B are views illustrating a battery module having a construction for detecting the volume change of battery cells according to another preferred embodiment of the present invention.
Figure 3B:
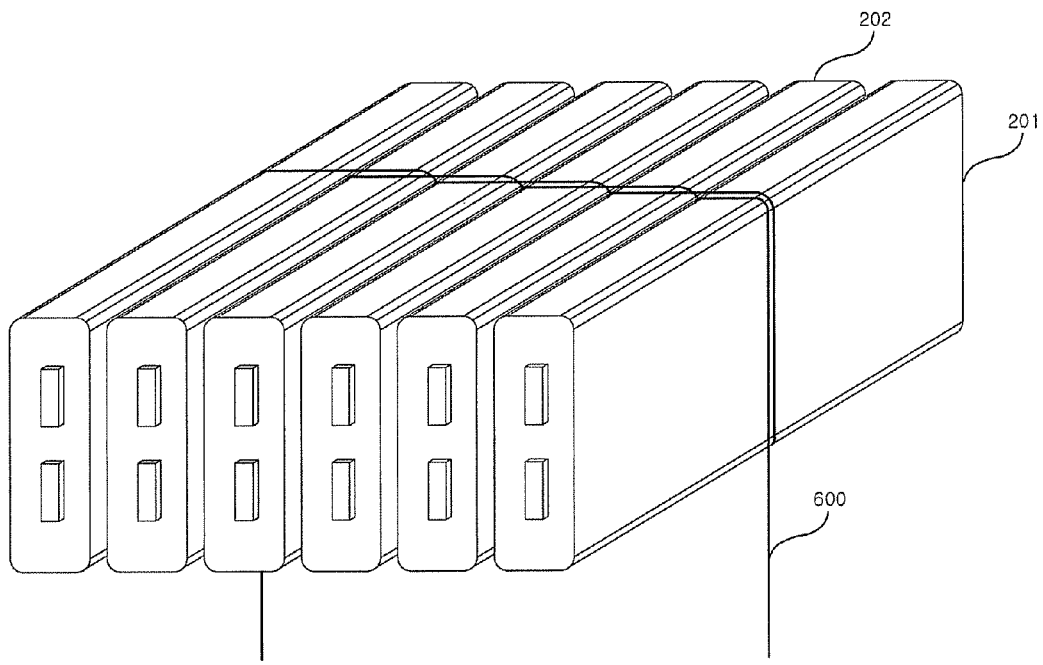

FIGS. 3A and 3B are views a battery module having a construction for detecting the volume change of battery cells according to another preferred embodiment of the present invention.

Referring to these drawings, wire members 600, as sensors for measuring the volume change of the respective battery cells, are connected with each other while the wire members 600 surround the outer surfaces of the battery cells 201, 202. . . . The wire members 600 are continuously connected with each other as a single unit. Consequently, the wire members 600 are generally connected in series with each other. In FIG. 3A, the wire members 600 surround the outer surfaces of the battery cells 201, 202 . . . in zigzags. In FIG. 3B, the wire members 600 completely surround the outer surfaces of the battery cells 201, 202 . . . once.

When abnormal volume expansion occurs at one of the battery cells 201, 202 . . . constituting the battery module 100, for example, the battery cell 203, a tensile force is applied to the corresponding wire member 600, and the applied tensile force (the detected signal) is transmitted to a control unit (not shown), where a necessary control operation is carried out.

The volume change of the battery cells 201, 202 . . . is less than the temperature change of the battery cells 201, 202 . . . . For this reason, the respective wire members may be used by a unit of two or more battery cells so as to increase the accuracy of measurement. Even in this case, however, it is preferable to minimize the number of the wire members so as to simplify the overall structure of the battery module.

Figure 4:
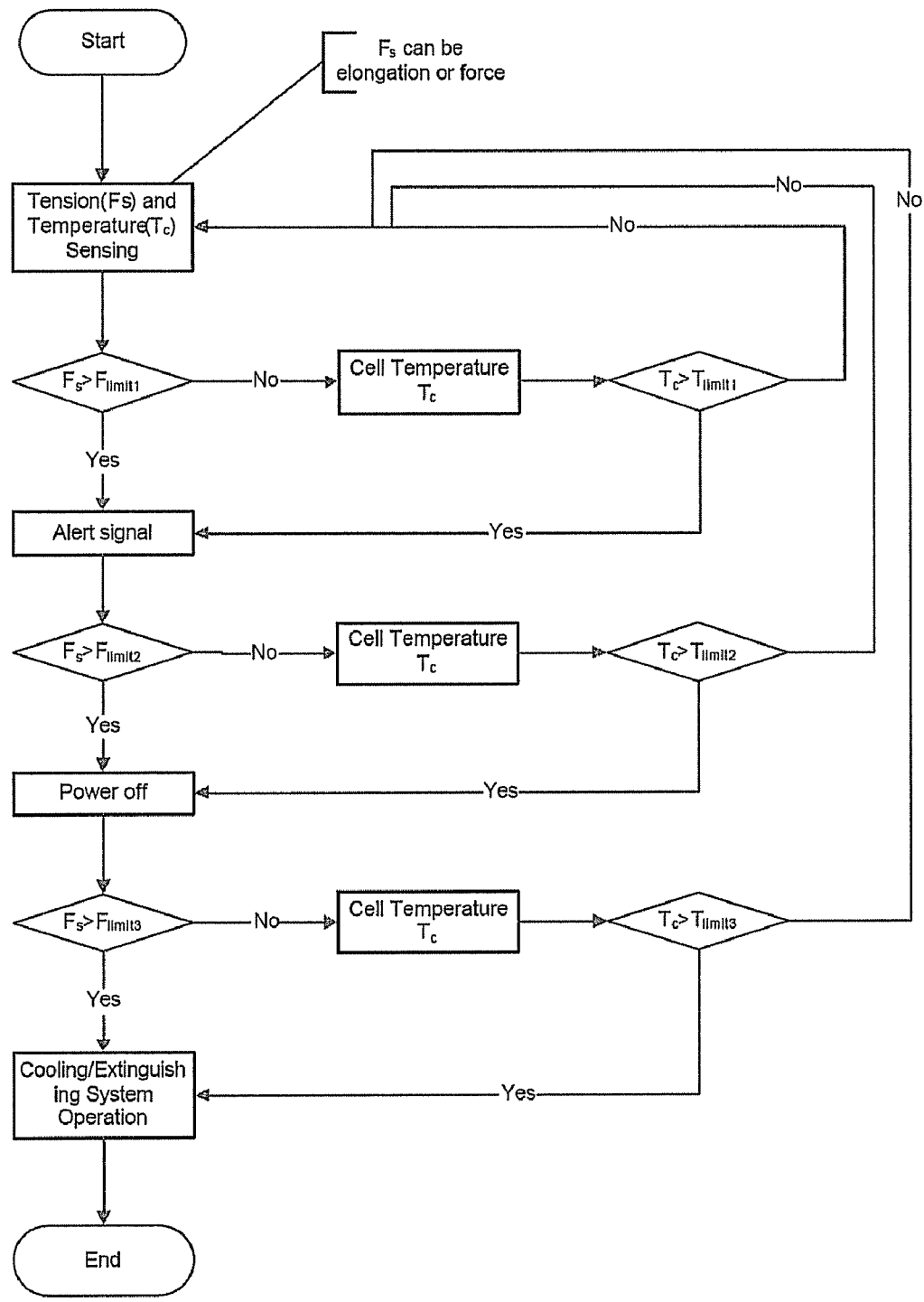
FIG. 4 is a flow chart illustrating a predetermined control process performed with respect to a battery module by a control unit based on information of physical operation states of battery cells, such as the temperature change and the volume change, according to a preferred embodiment of the present invention.

FIG. 4 is a flow chart illustrating a predetermined control process performed with respect to a battery module by a control unit based on information of physical operation states of battery cells, such as the temperature change and the volume change, according to a preferred embodiment of the present invention.

As shown in FIG. 4, the control process includes a step of transmitting an alert signal, a step of turning power off, a step of operating a cooling system, and a step of operating an extinguishing system. The respective steps are performed after the determination of whether information detected from the battery cells exceeds a predetermined expansibility and temperature range.

INDUSTRIAL APPLICABILITY

As apparent from the above description, the battery module according to the present invention is characterized in that the detection units are mounted to the respective battery cells, and therefore, the accuracy of information on the physical operation state of the battery cells is improved, and the circuit for transmitting the detected signals to the control unit is simple although the number of the detection units is large. Consequently, it is possible to construct a battery module having a simple structure. In addition, the volume change measurement sensors formed in a specific shape are used for a battery module using lithium secondary batteries as unit cells, and therefore, it is possible to accomplish the simple structure of the battery module with reduced costs and to secure the safety of the battery module with high accuracy.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A medium- or large-sized battery module, comprising:
    a plurality of battery cells; and
    detection units, which detect a physical operation state of the battery cells,
    wherein the detection units are mounted to the respective battery cells, the detection units are connected to a control unit of the battery module and the detection units are connected in series with each other,
    wherein detected signals from the detection units of the respective battery cells—are transmitted to the control unit as a single signal, and
    wherein the detection units include volume change detection units including wire members, each volume change detection unit including at least one wire member, the wire members continuously connected with each other and disposed on an outer surface of the battery cells.

2. The battery module according to claim 1, wherein the wire members are connected with each other in zigzags such that the wire members are on opposite major surfaces of neighboring battery cells.

3. The battery module according to claim 1, wherein the wire members are connected with each other such that the wire members overlay an outer surface of each battery cell once or more, and the wire members also overlay an outer surface of a neighboring battery cell in the same manner.

4. The battery module according to claim 1, wherein the wire members are continuously connected with each other such that the wire members overlay a middle part of the battery cells, the volume change of which is large at a time of expansion of the battery cells.

5. The battery module according to claim 1, wherein detected signals of the battery cells transmitted to the control unit through the wire members are used as input data for execution of a predetermined algorithm for securing the safety of the battery cells or as operation signals for performing an mechanical operation based on a change of a tensile force of the wire members.

6. The battery module according to claim 5, wherein the control unit includes a safety switch that is operated in a mechanical operating fashion, or the control unit is a safety switch, and, when the magnitude of the change of the tensile force transmitted from the wire members exceeds a predetermined level, the safety switch is cut off.

7. The battery module according to claim 1, wherein the control unit performs a predetermined control process when the detected signals transmitted from the detection units exceed a predetermined critical value.

8. The battery module according to claim 7, wherein the control process includes a first control step of transmitting an alert signal, a second control step of turning power off, a third control step of operating a cooling system, and a fourth control step of operating an extinguishing system.

9. The battery module according to claim 1, wherein the control unit is included in a battery management system (BMS) that manages the operation of the battery module.

10. The battery module according to claim 3, wherein the wire members surround each battery cell.

11. A battery module, comprising: a plurality of battery cells; and a plurality of detection units, which detects a physical operation state of the battery cells, wherein the plurality of detection units comprises a plurality of wire members, each wire member of the plurality of wire members disposed on an outer surface of a respective battery cell of the plurality of battery cells, wherein each wire member of the plurality of wire members detects a volume change of a battery cell of the plurality of battery cells, the plurality of wire members are connected to a control unit and the plurality of wire members are connected in series to each other, and wherein signals from the plurality of wire members are transmitted to the control unit as a single signal.

12. The battery module of claim 11, wherein the plurality of wire members encircle the outer surface of each respective battery cell.

13. The battery module of claim 11, wherein the plurality of wire members encircle a middle part of each respective battery cell.

14. The battery module of claim 11, further comprising a plurality of temperature sensors connected in series with each other, wherein only a first temperature sensor and a last temperature sensor of the plurality of temperature sensors are directly connected to the control unit.

* * * * *